US008792241B2

United States Patent
Hsu et al.

(10) Patent No.: US 8,792,241 B2
(45) Date of Patent: Jul. 29, 2014

(54) ASSEMBLY OF AN ELECTRONIC DEVICE CASING, A HEAT-DISSIPATING MODULE AND A WATERPROOFING MODULE, AND THE WATERPROOFING MODULE

(75) Inventors: Po-Yuan Hsu, New Taipei (TW);
Wei-Cheng Wang, New Taipei (TW);
Chen-Yu Li, New Taipei (TW);
Hsing-Wang Chang, New Taipei (TW);
Tsung-Hsien Chen, New Taipei (TW);
Chia-Cheng Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 394 days.

(21) Appl. No.: 13/329,546

(22) Filed: Dec. 19, 2011

(65) Prior Publication Data
US 2012/0188718 A1 Jul. 26, 2012

(30) Foreign Application Priority Data
Jan. 24, 2011 (TW) .............................. 100201526 U

(51) Int. Cl.
*H05K 7/20* (2006.01)
*G06F 1/20* (2006.01)
*G06F 1/16* (2006.01)

(52) U.S. Cl.
CPC .............. *G06F 1/203* (2013.01); *G06F 1/1658* (2013.01)
USPC ................. 361/700; 361/679.47; 361/679.52; 361/707; 361/710

(58) Field of Classification Search
CPC ..... G06F 1/203; G06F 1/1633; G06F 1/1656; G06F 1/1658; H05K 7/20172; H05K 7/20336
USPC .............. 361/679.47, 679.52, 700, 707, 710; 277/390, 392–395
See application file for complete search history.

(56) References Cited

U.S. PATENT DOCUMENTS

| 7,336,489 | B1 * | 2/2008 | Chen et al. ..................... 361/700 |
| 7,405,930 | B2 * | 7/2008 | Hongo et al. ............. 361/679.48 |
| 7,649,738 | B2 * | 1/2010 | Hata et al. ................. 361/679.52 |
| 8,367,928 | B2 * | 2/2013 | Hsu et al. ......................... 174/50 |
| 8,469,408 | B2 * | 6/2013 | Li ..................................... 292/37 |
| 8,559,173 | B2 * | 10/2013 | Fujiwara et al. .......... 361/679.48 |
| 2008/0019093 | A1 * | 1/2008 | Hongo ........................... 361/693 |
| 2008/0043436 | A1 * | 2/2008 | Hung et al. .................... 361/700 |
| 2012/0120620 | A1 * | 5/2012 | Su et al. ........................ 361/752 |
| 2012/0188740 | A1 * | 7/2012 | Wang et al. .................... 361/807 |

* cited by examiner

*Primary Examiner* — Anatoly Vortman
*Assistant Examiner* — Jacob Crum
(74) *Attorney, Agent, or Firm* — John A. Fortkort; Fortkort & Houston P.C.

(57) ABSTRACT

An assembly includes an electronic device casing, a heat-dissipating module and a waterproofing module. The electronic device casing is formed with an encircling wall. The encircling wall has a wall body and an apertured portion formed in the wall body. The heat-dissipating module is coupled to the electronic device casing, is surrounded by the encircling wall, and includes a heat pipe extending through the apertured portion. The waterproofing module includes a waterproofing element that has a ring portion disposed on a top rim of the wall body, and a sleeve portion having a first sleeve segment that is connected to the ring portion, that is sleeved on the heat pipe and that engages the apertured portion so as to establish water tightness between the heat pipe and the apertured portion.

20 Claims, 8 Drawing Sheets

US 8,792,241 B2

ASSEMBLY OF AN ELECTRONIC DEVICE CASING, A HEAT-DISSIPATING MODULE AND A WATERPROOFING MODULE, AND THE WATERPROOFING MODULE

CROSS-REFERENCE TO RELATED APPLICATION

This application claims priority of Taiwanese Application No. 100201526, filed on Jan. 24, 2011, the disclosure of which is incorporated herein by reference.

BACKGROUND OF THE INVENTION

1. Field of the Invention

The invention relates to an assembly of an electronic device casing and a heat-dissipating module, more particularly to an assembly of an electronic device casing, a heat-dissipating module and a waterproofing module.

2. Description of the Related Art

In order to achieve a better heat-dissipating effect, a conventional electronic device (e.g., a portable computer) is provided with a heat-dissipating module that is placed in a casing of the electronic device and that includes a fan, a heat-dissipating fin base and a heat pipe. Heat produced during operation of the electronic device is conducted via the heat pipe to the heat-dissipating fin base, and dissipated through the operation of the fan. To obtain better air ventilation, at least one opening is required to be formed in the casing of the electronic device for the fan to expel hot air therethrough from the electronic device. Nonetheless, the opening undesirably allows fluid and dust to enter the casing of the electronic device, thereby adversely affecting the operation of other elements of the electronic device. This issue is more critical to electronic devices that require relatively high waterproof and dustproof effects to work properly.

SUMMARY OF THE INVENTION

Therefore, the object of the present invention is to provide an assembly of an electronic device casing, a heat-dissipating module and a waterproofing module, which has relatively high waterproof and dustproof effects by virtue of the waterproofing module.

Accordingly, an assembly of an electronic device casing, a heat-dissipating module and a waterproofing module of the present invention includes an electronic device casing, a heat-dissipating module and a waterproofing module. The electronic device casing is formed with an encircling wall. The encircling wall has a wall body and an apertured portion that is formed in the wall body. The wall body has a top rim. The heat-dissipating module is coupled to the electronic device casing, is surrounded by the encircling wall, and includes a heat pipe that extends through the apertured portion. The waterproofing module includes a waterproofing element that has a ring portion disposed on the top rim of the wall body of the encircling wall, and a sleeve portion having a first sleeve segment that is connected to the ring portion, that is sleeved on the heat pipe and that engages the apertured portion so as to establish water tightness between the heat pipe and the apertured portion.

The apertured portion has a first wall part having a first aperture rim, a second wall part spaced apart from the first wall part, and an engaging groove formed between the first wall part and the second wall part. The first sleeve segment has a first sleeve segment body abutting against the first aperture rim, and a second sleeve segment body connected to a longitudinal end of the first sleeve segment body, extending radially and outwardly relative to the first sleeve segment body, and engaging the engaging groove of the apertured portion.

The apertured portion further has a connecting wall part that interconnects the first wall part and the second wall part and that cooperates with the first and second wall parts to define the engaging groove, and a first projecting strip that projects from the connecting wall part into the engaging groove. The second sleeve segment body has a second outer surface and a slot formed in the outer surface. The first projecting strip engages the slot.

The first sleeve segment body has a first outer surface. The first sleeve segment further has a second projecting strip that projects from the first outer surface, and that abuts against the first aperture rim of the first wall part.

The sleeve portion further has a second sleeve segment that is connected integrally to the first sleeve segment and that is sleeved on the heat pipe. The waterproofing module further includes a clamping member that surrounds the second sleeve segment so as to establish water tightness between the heat pipe and the second sleeve segment.

The second sleeve segment has a first sleeve part with a C-shaped cross section and two extending plates. The first sleeve part has two first end rims. The extending plates extend respectively from the first end rims. The clamping member has a second sleeve part with a C-shaped cross section and two clamping plates. The second sleeve pipe part has two second end rims. The clamping plates extend respectively from the second end rims. The second sleeve part of the clamping member surrounds the first sleeve part of the second sleeve segment. The extending plates of the second sleeve segment are clamped between and secured to the clamping plates of the clamping member.

The apertured portion further has a block protruding from the second wall part. The extending plates and the clamping plates are secured to the block.

The ring portion has a ring body having a bottom surface that is formed with an engaging trench for engagement with the top rim.

The engaging trench extends from the bottom surface of the ring portion and terminates at an inner bottom surface. The ring portion further has a third projecting strip that projects from the inner bottom surface into the engaging trench and that is in contact with the encircling body.

The ring body of the ring portion further has a top surface. The ring portion further has a surrounding projecting strip that projects from the top surface for contacting a predetermined portion of the electronic device casing.

The electronic device casing includes a first casing member that is formed with an opening and that is in contact with the ring portion, a second casing member that is coupled separably to the first casing member, and a support body that is disposed between the first and second casing members and that has a baseplate formed with the wall body. The heat-dissipating module further includes a fan that is removably disposed in and exposed from the opening.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

Figure 1:
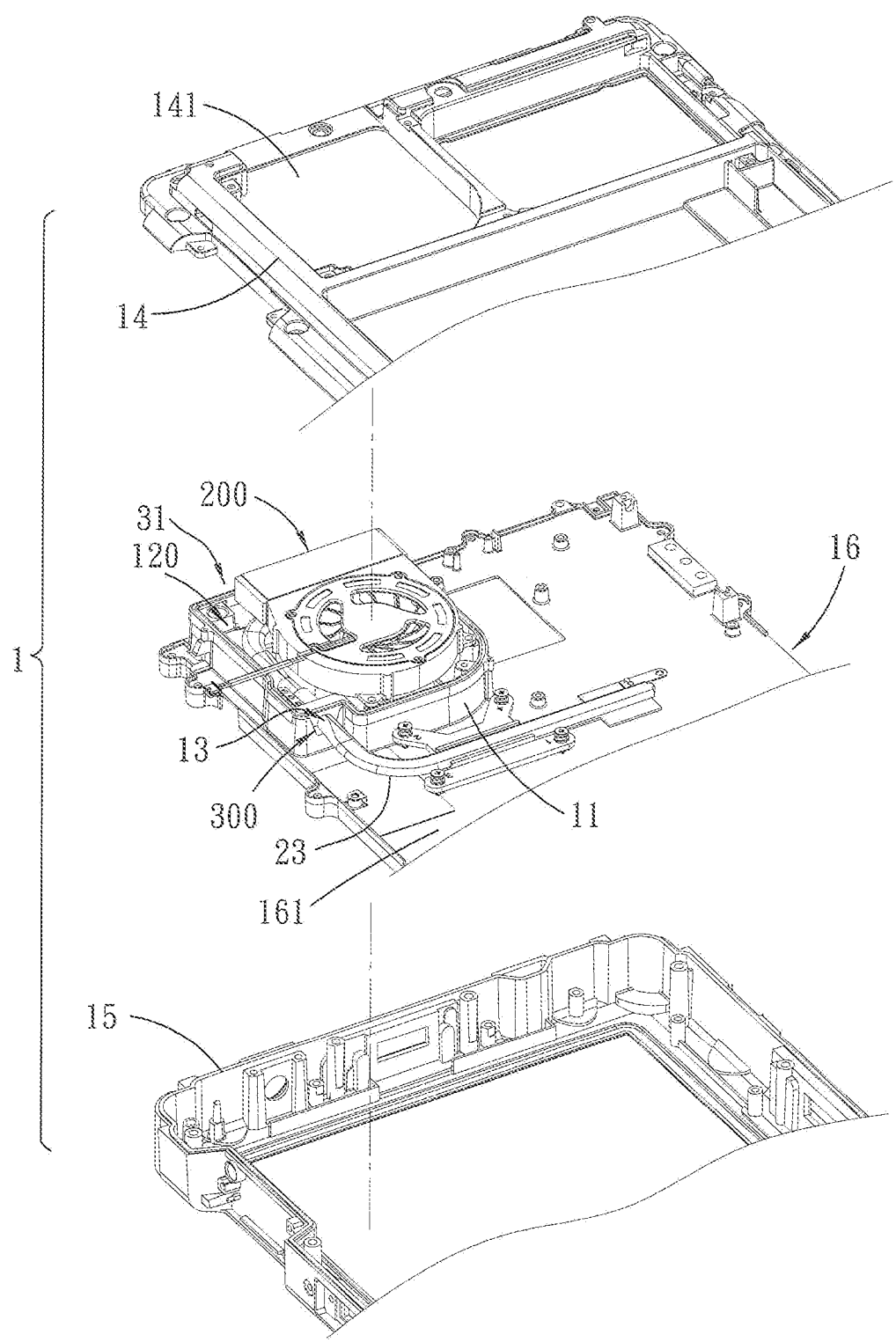
FIG. 1 is a fragmentary partly exploded perspective view of an embodiment of an assembly of an electronic device casing, a heat-dissipating module and a waterproofing module according to the invention, with the heat-dissipating module and the waterproofing module coupled to a support body of the electronic device casing.

As shown in FIG. 1, the embodiment of an assembly of an electronic device casing, a heat-dissipating module and a waterproofing module, according to the present invention includes an electronic device casing 1, a heat-dissipating module 200 and a waterproofing module 300.

Figure 2:
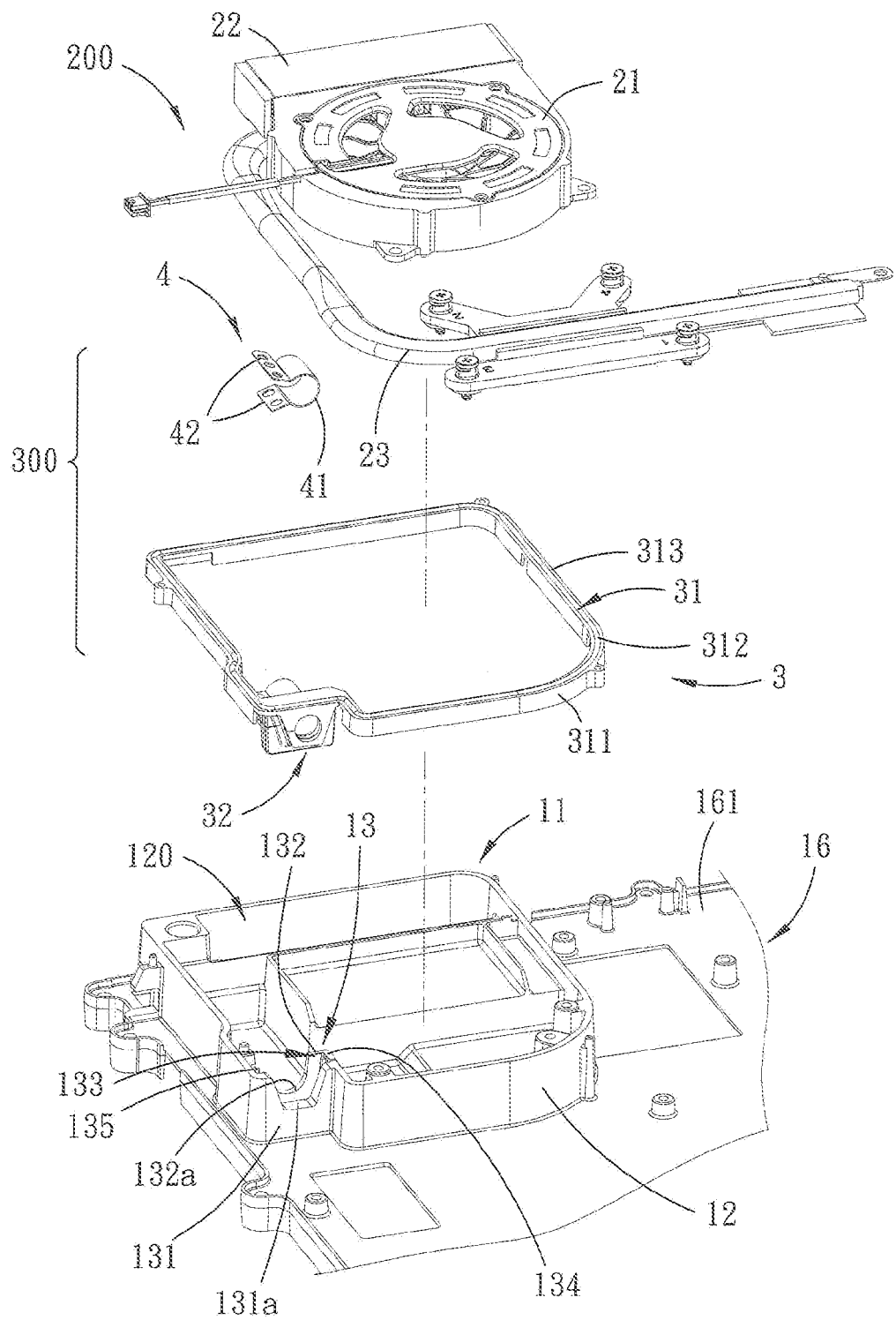
FIG. 2 is a fragmentary exploded perspective view of the embodiment.
Figure 3:
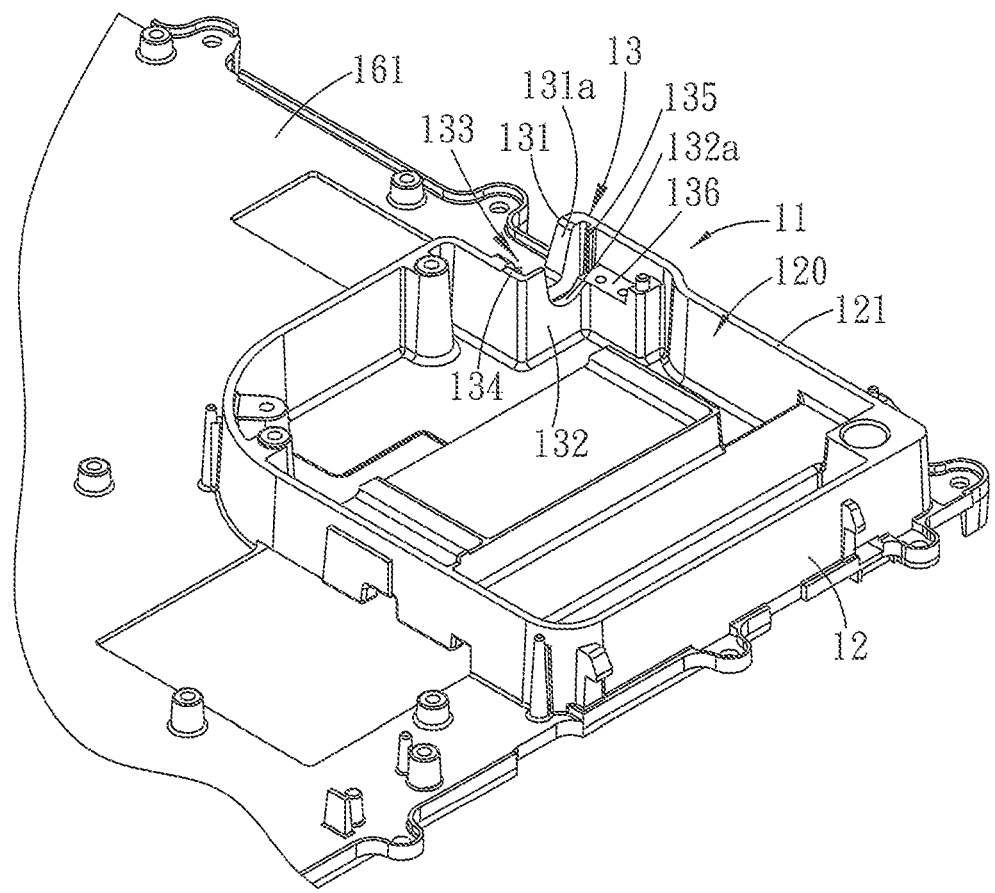
FIG. 3 is an enlarged fragmentary perspective view of the support body.

Further referring to FIGS. 2 and 3, the electronic device casing 1 is formed with an encircling wall 11. The encircling wall 11 has a wall body 12 and an apertured portion 13 that is formed in the wall body 12. The wall body 12 has a top rim 121. To be specific, the electronic device casing 1 in this embodiment includes a first casing member 14, a second casing member 15 that is coupled separably to the first casing member 14, and a support body 16. The support body 16 is disposed between the first and second casing members 14 and 15, and has a baseplate 161 formed with the wall body 12 of the encircling wall 11 therein on the baseplate 161. The wall body defines a local area 120. The first casing member 14 is formed with an opening 141 that is registered with the local area 120.

In this embodiment, the apertured portion 13 has a first wall part 131, a second wall part 132 spaced apart from the first wall part 131, and a connecting wall part 134 interconnecting the first and second wall part 131 and 132. The first wall part 131 has a substantially U-shaped first aperture rim 131a, and the second wall part 132 has a substantially U-shaped second aperture rim 132a. The connecting wall 134 cooperates with the first and second wall parts 131, 132 to define an engaging groove 133 thereamong. In practice, the first wall part 131, the second wall part 132 and the connecting wall part 134 are connected integrally to the wall body 12. The apertured portion 13 further has a first projecting strip 135 that projects from the connecting wall part 134 into the engaging groove 133, and a block 136 that protrudes from the second wall part 132, that is connected to the wall body 12 and that is located in the local area 120.

The heat-dissipating module 200 includes a fan 21, a heat-dissipating fin seat 22 that is provided on the fan 21 and a heat pipe 23 that has an end extending through the heat-dissipating fin seat 22. The heat-dissipating module 200 is coupled to the baseplate 161 of the support body 16 of the electronic device casing 1, is surrounded by the encircling wall 11, and is located in the local area 120. The heat pipe 23 has another end that extends out of the local area 120 through the apertured portion 13 for contacting an electronic element (not shown).

When the heat-dissipating module 200 is disposed on the support body 16, the fan 21 is removably disposed in and exposed from the opening 141 of the first casing member 14 (see FIG. 1).

Figure 4:
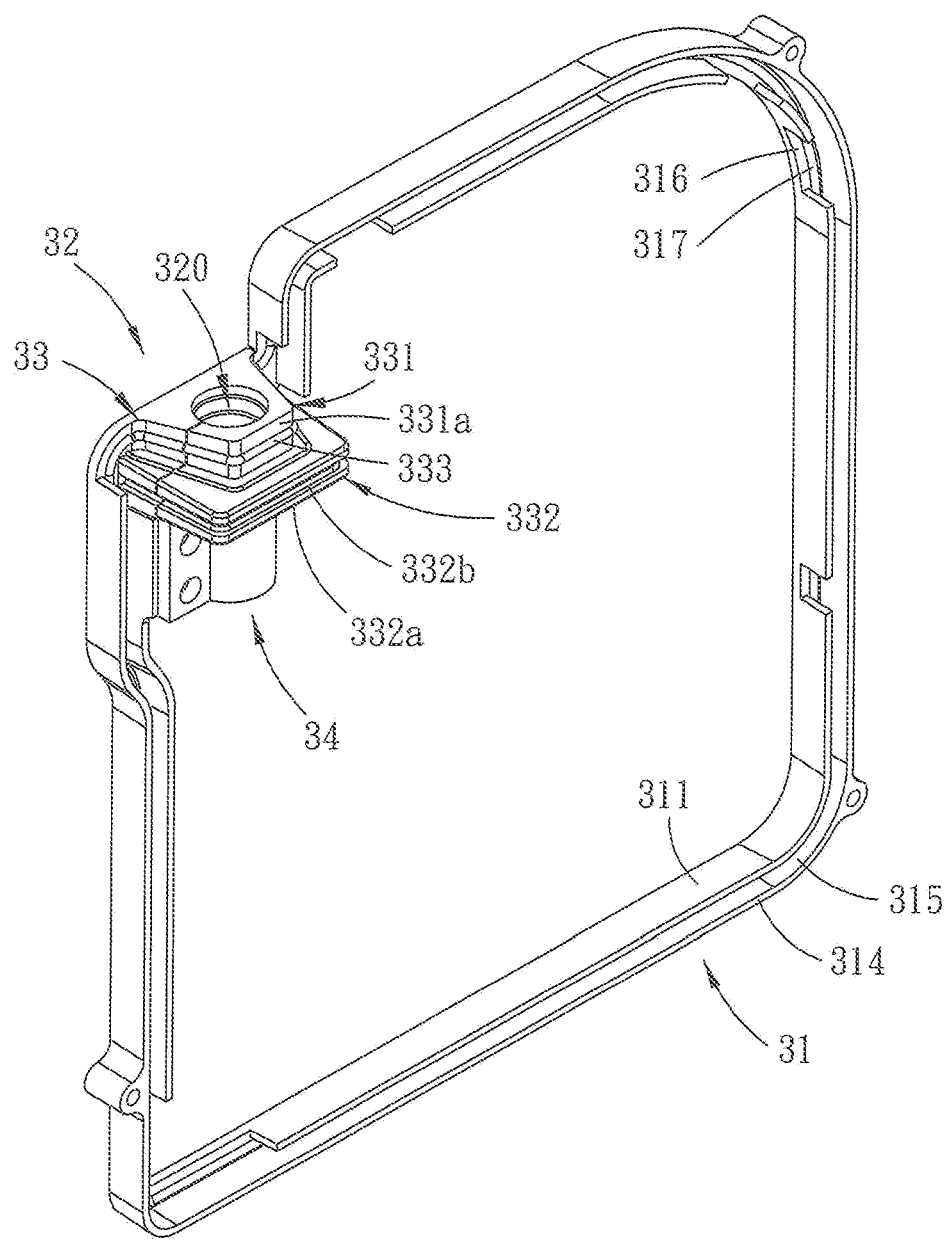
FIG. 4 is a perspective view of a waterproofing element of the waterproofing module.

Further referring to FIGS. 2 and 4, the waterproofing module 300 includes a waterproofing element 3 and a clamping member 4. In this embodiment, the waterproofing element 3 is integrally made of rubber, and has a ring portion 31 and a sleeve portion 32. The ring portion 31 has a ring-shaped ring body 311 and a surrounding projecting strip 312. The ring body 311 has a top surface 313 and a bottom surface 314, and the surrounding projecting strip 312 projects from the top surface 313. The bottom surface 314 of the ring body 311 is formed with an engaging trench 315 such that the ring body 311 has an inverted U-shaped cross section. Additionally, the engaging trench 315 extends from the bottom surface 314 of the ring portion 31 and terminates at an inner bottom surface 316, and the ring portion 31 further has a third projecting strip 317 that projects from the inner bottom surface 316 into the engaging trench 315.

Figure 5:
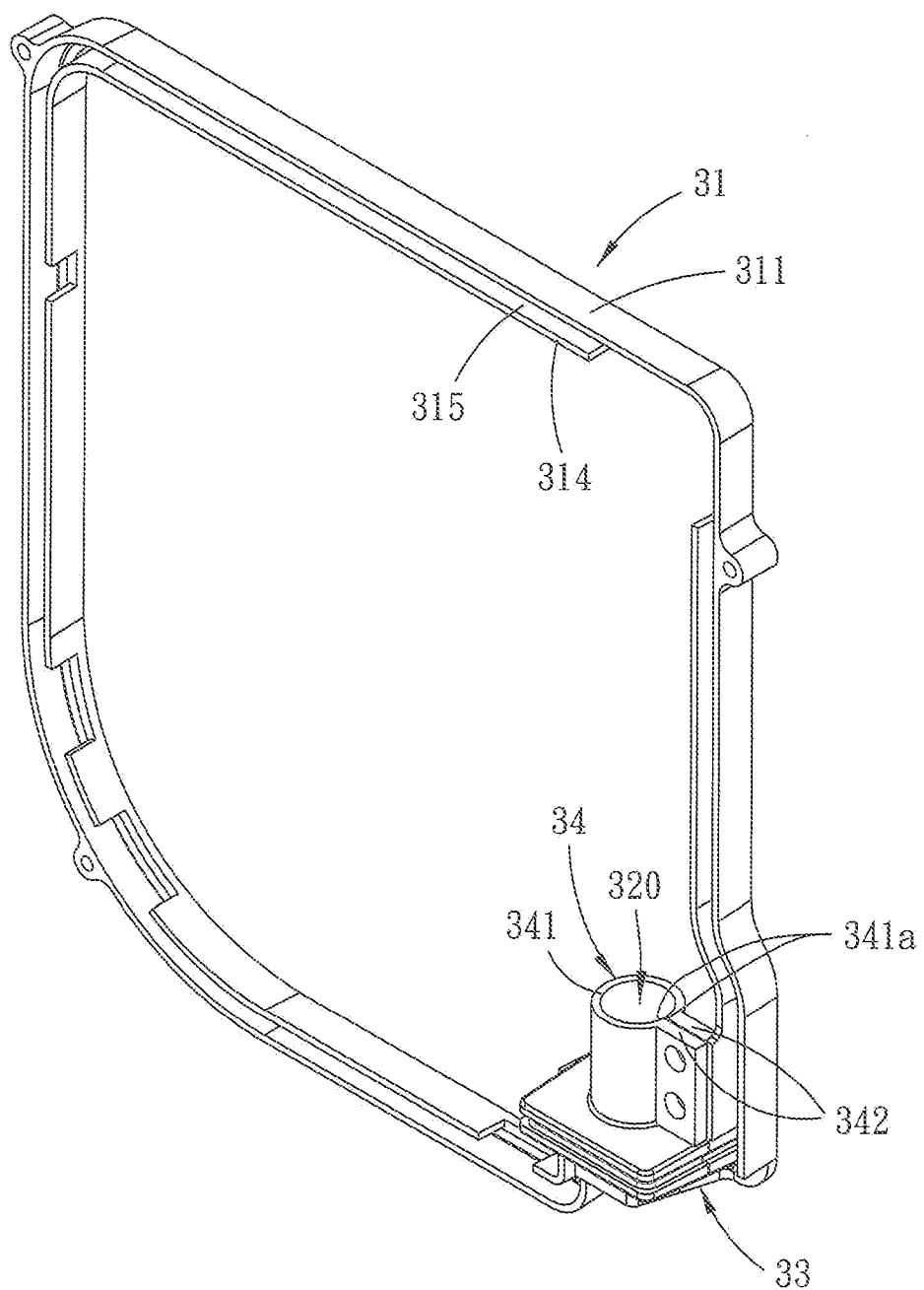
FIG. 5 is another perspective view of the waterproofing element viewed from another angle.
Figure 6:
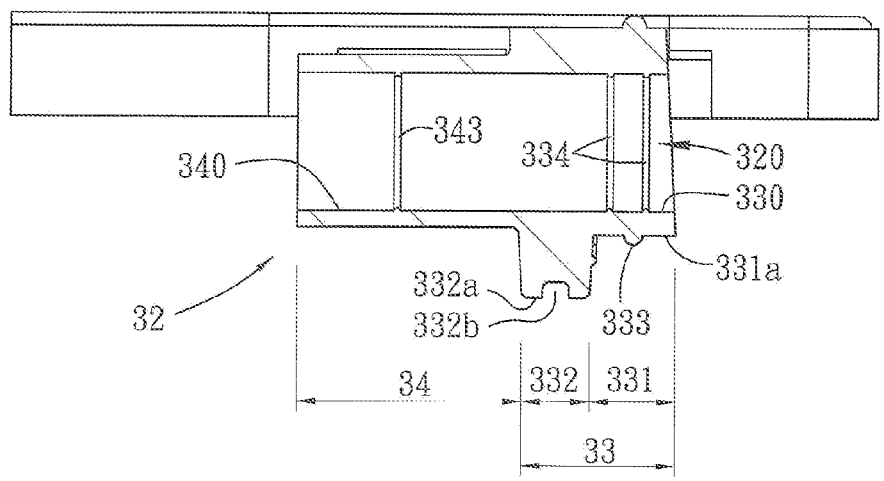
FIG. 6 is a sectional view illustrating a sleeve portion of the waterproofing element.
Figure 7:
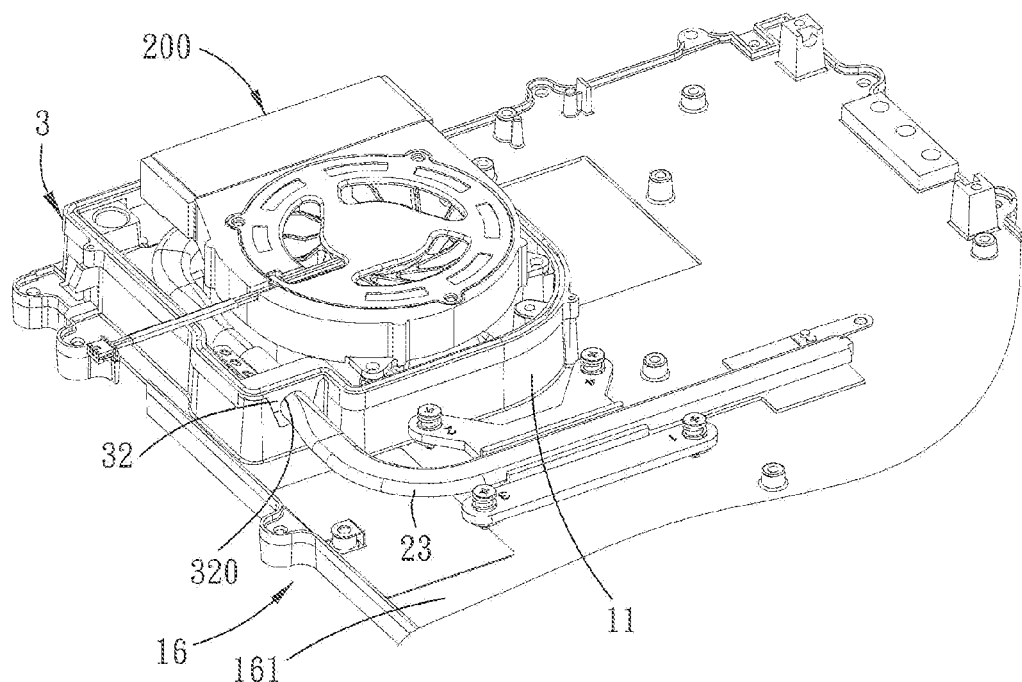
FIG. 7 is an enlarged fragmentary assembled perspective view of the embodiment.

Further referring to FIGS. 5 and 6, the sleeve portion 32 is formed with a tube hole 320 that is for extension of the heat pipe 23 therethrough. In this embodiment, the sleeve portion 32 includes a first sleeve segment 33 and a second sleeve segment 34 that is connected integrally to the first sleeve segment 33. The first sleeve segment 33 is connected to the ring body 311, has a C-shaped cross section, and is formed with a first inner surrounding surface 330. The second sleeve segment 34 is configured to have a C-shaped cross section, and has a second inner surrounding surface 340 that is connected to the first inner surface 330 and that cooperates with the first inner surface 330 to define the tube hole 320.

To be specific, the first sleeve segment 33 includes a first sleeve segment body 331, a second sleeve segment body 332 that is connected to a longitudinal end of the first sleeve segment body 331 and that extends radially and outwardly relative to the first sleeve segment body 331, and a second projecting strip 333. The first sleeve segment body 331 has a first outer surface 331a that is substantially U-shaped, and the second projecting strip 333 projects from the first outer surface 331a. The second sleeve segment body 332 has a second outer surface 332a that is substantially U-shaped, and a slot 332b is formed in the second outer surface 332a.

The second sleeve segment 34 has a first sleeve part 341 with a C-shaped cross section and two extending plates 342. The first sleeve part 341 has two first end rims 341a, and the extending plates 342 extend respectively from the first end rims 341a. One of the extending plates 342 is connected to an intersection of the second sleeve segment body 332 and the ring body 311 of the ring portion 31.

Additionally, the first sleeve segment 33 further includes at least one first inner strip 334 that projects from the first inner surrounding surface 330, and the second sleeve segment 34 further includes at least one second inner strip 343 that projects from the second inner surrounding surface 340.

Figure 9:
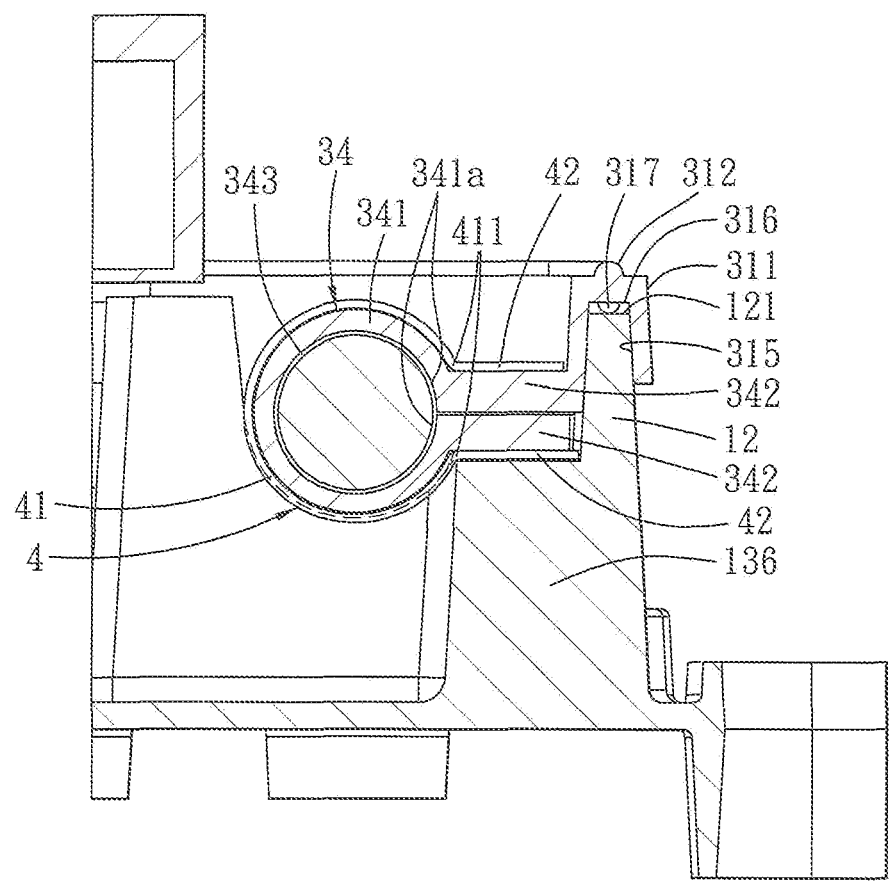
FIG. 9 is another enlarged fragmentary view of the embodiment.

Referring back to FIG. 2 and further referring to FIG. 9, the clamping member 4 may be made of a metal material, and has a second sleeve part 41 with a C-shaped cross section and two clamping plates 42. The second sleeve part 41 have two second end rims 411, and the clamping plates 42 extend respectively from the second end rims 411.

The engaging trench 315 of the waterproofing element 3 engages the top rim 121 of the wall body 12. When the support body 16 is disposed on the first casing member 14 (see FIG. 1) and the second casing member 15 (see FIG. 1), the first casing member 14 is in contact with the surrounding strip 312 of the ring portion 31, to secure the ring body 311 onto the top rim 121 of the wall body 12, such that the ring portion 31 is firmly positioned between the encircling wall 11 of the supporting body 16 and the first casing member 14. The line contacts between the surrounding projecting strip 312 of the ring portion 31 and the first casing member 14, and that between the third projecting strip 317 of the ring portion 31 and the top rim 121 of the wall body 12 result in tight abutments between the surrounding strip 312 and first casing member 14 and between the third projecting strip 317 and top rim 121, thereby avoiding the presence of gaps thereamong.

Figure 8:
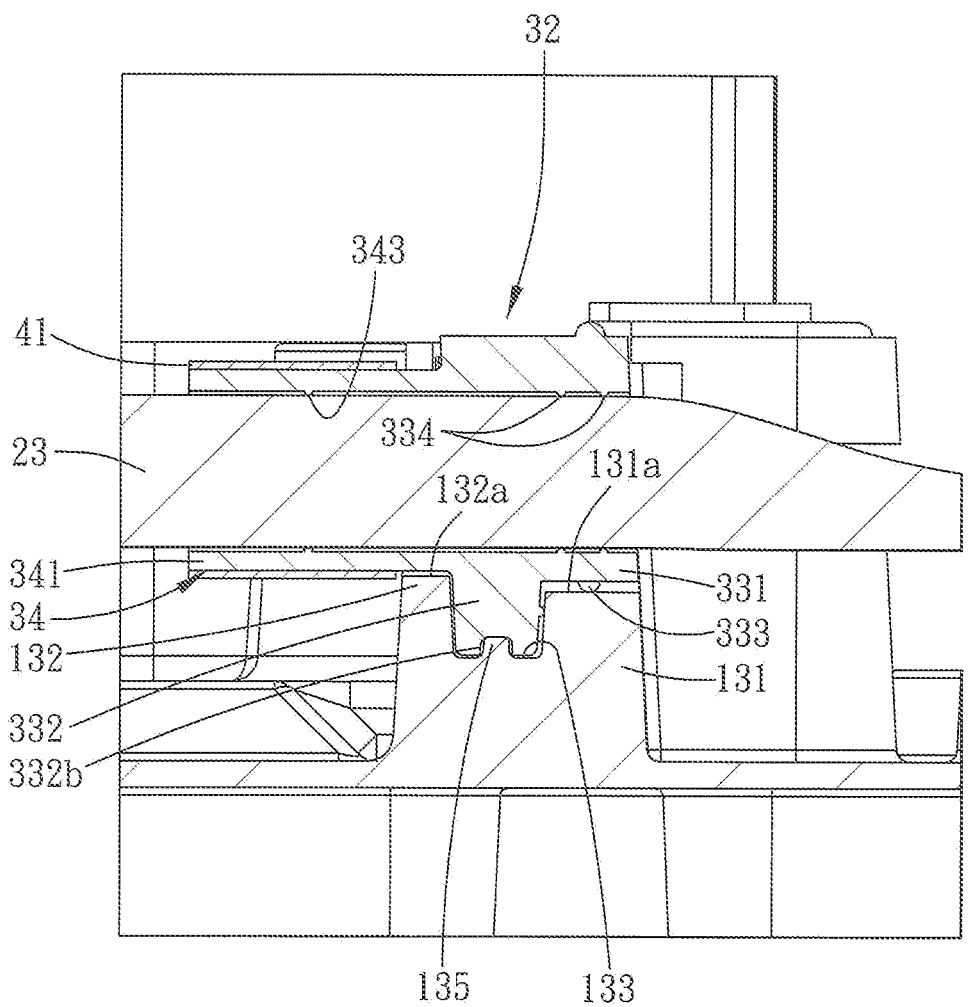
FIG. 8 is an enlarged fragmentary view of the embodiment.

Further referring to FIGS. 6 and 8, the sleeve portion 32 is sleeved on the heat pipe 23 and engages the apertured portion 13 with the second sleeve segment body 332 engaging the engaging groove 133 of the apertured portion 13 and the first projecting strip 135 of the apertured portion 13 engaging the slot 332b of the second sleeve segment body 332. The second projecting member 333 of the first sleeve segment 33 abuts against the first aperture rim 131a of the first wall part 131. The first sleeve part 341 of the second sleeve segment 34 abuts against the second aperture rim 132a of the second wall part 132. The sleeve portion 32 is limited by the first casing member 14, such that the first inner strip 334 of the first sleeve segment 33 abuts tightly against an outer surrounding surface of the heat pipe 23 so as to ensure that no gap exists between the first sleeve segment 33 and the heat pipe 23.

Moreover, the configuration of the engagement between the second sleeve segment body 332 of the sleeve portion 32 and the engaging groove 133 of the apertured portion 13 and the configuration of the engagement between the first projecting strip 135 and the slot 332b also restrain fluid and dust from passing through the apertured portion 13.

Further referring to FIG. 9, the second sleeve part 41 of the clamping member 4 surrounds the first sleeve part 341 of the second sleeve segment 34, and the extending plates 342 of the second sleeve segment 34 are clamped between and secured to the clamping plates 42 of the clamping member 4. The extending plates 342 and the clamping plates 42 are secured to the block 136 such that the second inner strip 343 of the second sleeve segment 34 is urged to abut against the surface of the heat pipe 23, so as to ensure that no gap exists between the second sleeve segment 34 and the heat pipe 23.

It should be noted that, the second sleeve segment body 332 of the first sleeve segment 33 of the waterproofing element 3, and the engaging groove 133 and the first projecting strip 135 of the apertured portion 13 may be omitted, leaving the first sleeve segment 33 shortened and only the first sleeve segment body 331 to engage the apertured portion 13. Such a configuration is still capable of achieving sufficient waterproof and dustproof effect while the presence of the second sleeve segment body 332 and the engaging groove 133 of the apertured portion 13 certainly extends the length of the sleeve portion 32 to be sleeved on the heat pipe 23, for further enhancing the waterproof and dustproof effect. Moreover, the sleeve portion 32 may also be configured as an enclosed tube instead of a C-shaped tube, and is still capable of achieving the same waterproof and dustproof effect as well when being sleeved on the heat pipe 23.

Therefore, to sum up, the configuration of the waterproofing element 3 and the apertured portion 13 of the encircling wall 11 of the present invention establishes water tightness between the first casing member 14 and the top rim 121 of the wall body 12, and the configuration of the sleeve portion 32 establishes water tightness between the heat pipe 23 of the heat-dissipating module 2 and the apertured portion 13 of the encircling wall 11. Once water and dust enter the local area 120 through the opening 141 of the first casing member 14, they would hardly further travel outwardly of the local area 120 through the encircling wall 11. Compared to the above-mentioned conventional electrical device, a better waterproof and dustproof effect is thus enhanced. Moreover, the fan 21, can be detached from the electronic device casing 1 conveniently through the opening 141.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An assembly of an electronic device casing, a heat-dissipating module and a waterproofing module, comprising:
   an electronic device casing formed with an encircling wall, said encircling wall having a wall body and an apertured portion that is formed in said wall body, said wall body having a top rim;
   a heat-dissipating module coupled to said electronic device casing, surrounded by said encircling wall, and including a heat pipe that extends through said apertured portion; and
   a waterproofing module including a waterproofing element that has
      a ring portion disposed on said top rim of said wall body of said encircling wall, and
      a sleeve portion having a first sleeve segment that is connected to said ring portion, that is sleeved on said heat pipe and that engages said apertured portion so as to establish water tightness between said heat pipe and said apertured portion.

2. The assembly as claimed in claim 1, wherein:
   said apertured portion has:
      a first wall part having a first aperture rim,
      a second wall part spaced apart from said first wall part; and
      an engaging groove formed between said first wall part and said second wall part; and
   said first sleeve segment has a first sleeve segment body abutting against said first aperture rim, and a second sleeve segment body connected to a longitudinal end of said first sleeve segment body, extending radially and outwardly relative to said first sleeve segment body, and engaging said engaging groove of said apertured portion.

3. The assembly as claimed in claim 2, wherein:
   said apertured portion further has a connecting wall part that interconnects said first wall part and said second wall part and that cooperates with said first and second wall parts to define said engaging groove, and a first projecting strip that projects from said connecting wall part into said engaging groove; and
   said second sleeve segment body has a second outer surface and a slot formed in said outer surface, said first projecting strip engaging said slot.

4. The assembly as claimed in claim 2, wherein:
   said first sleeve segment body has a first outer surface; and
   said first sleeve segment further has a second projecting strip that projects from said first outer surface, and that abuts against said first aperture rim of said first wall part.

5. The assembly as claimed in claim 2, wherein:
   said sleeve portion further has a second sleeve segment that is connected integrally to said first sleeve segment and that is sleeved on said heat pipe, and
   said waterproofing module further includes a clamping member that surrounds said second sleeve segment so as to establish water tightness between said heat pipe and said second sleeve segment.

6. The assembly as claimed in claim 5, wherein:
said second sleeve segment has a first sleeve part with a C-shaped cross section and two extending plates, said first sleeve part having two first end rims, said extending plates extending respectively from said first end rims; and
said clamping member has a second sleeve part with a C-shaped cross section and two clamping plates, said second sleeve pipe part having two second end rims, said clamping plates extending respectively from said second end rims, said second sleeve part of said clamping member surrounding said first sleeve part of said second sleeve segment, said extending plates of said second sleeve segment being clamped between and secured to said clamping plates of said clamping member.

7. The assembly as claimed in claim 6, wherein said apertured portion further has a block protruding from said second wall part, said extending plates and said clamping plates being secured to said block.

8. The assembly as claimed in claim 1, wherein said ring portion has a ring body having a bottom surface that is formed with an engaging trench for engagement with said top rim.

9. The assembly as claimed in claim 8, wherein said engaging trench extends from said bottom surface of said ring portion and terminates at an inner bottom surface, said ring portion further having a third projecting strip that projects from said inner bottom surface into said engaging trench and that is in contact with said encircling body.

10. The assembly as claimed in claim 8, wherein said ring body of said ring portion further has a top surface, and said ring portion further has a surrounding projecting strip that projects from said top surface for contacting a predetermined portion of said electronic device casing.

11. The assembly as claimed in claim 1, wherein:
said electronic device casing includes
a first casing member that is formed with an opening and that is in contact with said ring portion,
a second casing member that is coupled separably to said first casing member, and
a support body that is disposed between said first and second casing members and that has a baseplate formed with said wall body; and
said heat-dissipating module further includes a fan that is removably disposed in and exposed from said opening.

12. A waterproofing module to be disposed on an electronic device casing, the electronic device including a heat-dissipating module and being formed with an encircling wall, the encircling wall having a wall body and an apertured portion that is formed in the wall body, the wall body having a top rim, the heat-dissipating module being coupled to the electronic device casing, surrounded by the encircling wall, and including a heat pipe that extends through the apertured portion, said waterproofing module comprising:
a waterproofing element that has
a ring portion disposed on the top rim of the wall body of the encircling wall, and
a sleeve portion having a first sleeve segment that is connected to said ring portion, that is sleeved on the heat pipe and that engages the apertured portion so as to establish water tightness between the heat pipe and the apertured portion.

13. The waterproofing module as claimed in claim 12, the apertured portion having:
a first wall part having a first aperture rim;
a second wall part spaced apart from the first wall part; and
an engaging groove formed between the first wall part and the second wall part; wherein said first sleeve segment has a first sleeve segment body to abut against the first aperture rim, and a second sleeve segment body connected to a longitudinal end of said first sleeve segment body, extending radially and outwardly relative to said first sleeve segment body, and to engage the engaging groove of the apertured portion.

14. The waterproofing module as claimed in claim 13, the apertured portion further having a connecting wall part that interconnects the first wall part and the second wall part and that cooperates with the first and second wall parts to define the engaging groove, and a first projecting strip that projects from the connecting wall part into the engaging groove, wherein said second sleeve segment body has a second outer surface and a slot formed in said outer surface, the first projecting strip to engage said slot.

15. The waterproofing module as claimed in claim 13, wherein said first sleeve segment body has a first outer surface, and said first sleeve segment further has a second projecting strip that projects from said first outer surface, and that is to abut the first aperture rim of the first wall part.

16. The waterproofing module as claimed in claim 13, wherein said sleeve portion further has a second sleeve segment that is connected integrally to said first sleeve segment and that is to be sleeved on the heat pipe, and said waterproofing module further includes a clamping member that surrounds said second sleeve segment so as to establish water tightness between the heat pipe and said second sleeve segment.

17. The waterproofing module as claimed in claim 16, wherein:
said second sleeve segment has a first sleeve part with a C-shaped cross section and two extending plates, said first sleeve part having two first end rims, said extending plates extending respectively from said first end rims; and
said clamping member has a second sleeve part with a C-shaped cross section and two clamping plates, said second sleeve pipe part having two second end rims, said clamping plates extending respectively from said second end rims, said second sleeve part of said clamping member surrounding said first sleeve part of said second sleeve segment, said extending plates of said second sleeve segment being clamped between and secured to said clamping plates of said clamping member.

18. The waterproofing module as claimed in claim 12, wherein said ring portion has a ring body having a bottom surface that is formed with an engaging trench for engagement with the top rim.

19. The waterproofing module as claimed in claim 18, wherein said engaging trench extends from said bottom surface of said ring portion and terminates at an inner bottom surface, said ring portion further having a third projecting strip that projects from said inner bottom surface into said engaging trench and that is for contacting the encircling body.

20. The waterproofing module as claimed in claim 18, wherein said ring body of said ring portion further has a top surface, and said ring portion further has a surrounding projecting strip that projects from said top surface for contacting a predetermined portion of the electronic device casing.

* * * * *